(12) United States Patent
Ray

(10) Patent No.: US 8,320,555 B2
(45) Date of Patent: Nov. 27, 2012

(54) METHOD AND APPARATUS FOR DETERMINING A CHANGE IN NETWORK-GENERATED CROSSTALK LEVELS CAUSED BY A MULTI-LINE PHONE

(75) Inventor: Amar Nath Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1111 days.

(21) Appl. No.: 12/209,744

(22) Filed: Sep. 12, 2008

(65) Prior Publication Data

US 2010/0067665 A1 Mar. 18, 2010

(51) Int. Cl.
*H04M 1/24* (2006.01)
*H04M 9/00* (2006.01)
*H04B 1/38* (2006.01)
*H01R 24/00* (2006.01)
*H04Q 3/52* (2006.01)
*H04J 1/12* (2006.01)
*H03K 5/159* (2006.01)

(52) U.S. Cl. .......... 379/417; 250/559.29; 324/628; 370/201; 375/219; 375/222; 375/260; 375/295; 379/3; 379/22.02; 379/292; 379/416; 398/39; 439/676; 703/2

(58) Field of Classification Search .......... 324/628; 370/201; 375/219, 222, 260, 295; 379/3, 379/292, 416, 417, 22.02; 398/39; 439/676; 703/2; 250/559.29
See application file for complete search history.

(56) References Cited

U.S. PATENT DOCUMENTS

| 3,662,117 | A | * | 5/1972 | Bhatt et al. .............. 379/292 |
| 4,053,723 | A | * | 10/1977 | Arras et al. .............. 379/22.02 |
| 6,108,280 | A | * | 8/2000 | Morimoto ............. 369/13.32 |
| 6,115,330 | A | * | 9/2000 | Morimoto ............. 369/13.28 |
| 6,285,653 | B1 | * | 9/2001 | Koeman et al. ........... 370/201 |
| 6,647,067 | B1 | * | 11/2003 | Hjelm et al. ............. 375/260 |
| 7,002,897 | B2 | * | 2/2006 | Jones et al. .............. 370/201 |
| 7,016,822 | B2 | * | 3/2006 | Bosley et al. ............. 703/2 |
| 7,081,763 | B1 | * | 7/2006 | Zhu et al. ............... 324/628 |
| 7,164,764 | B2 | * | 1/2007 | Zimmerman et al. ....... 379/417 |
| 7,294,024 | B2 | * | 11/2007 | Hammond et al. ......... 439/676 |
| 7,352,687 | B2 | * | 4/2008 | Jones et al. .............. 370/201 |
| 7,567,666 | B2 | * | 7/2009 | Zimmerman et al. ....... 379/417 |
| 7,570,685 | B2 | * | 8/2009 | Takatori et al. .......... 375/219 |
| 7,646,699 | B2 | * | 1/2010 | Tellado et al. ........... 370/201 |
| 7,736,195 | B1 | * | 6/2010 | Poulsen et al. ........... 439/676 |
| 7,759,939 | B2 | * | 7/2010 | Skultety-Betz et al. ..... 324/326 |
| 7,948,862 | B2 | * | 5/2011 | Parnaby ................. 370/201 |
| 2002/0186428 | A1 | * | 12/2002 | Saleheen ................ 359/110 |
| 2005/0074055 | A1 | * | 4/2005 | Takatori et al. .......... 375/219 |
| 2006/0039456 | A1 | * | 2/2006 | Bostoen et al. ........... 375/222 |
| 2007/0047733 | A1 | * | 3/2007 | Bremer et al. ........... 379/416 |

(Continued)

*Primary Examiner* — Gerald Gauthier
(74) *Attorney, Agent, or Firm* — Patton Boggs LLP

(57) ABSTRACT

An embodiment of a method and apparatus for determining a change in network-generated crosstalk levels caused by a multi-line phone includes determining a first crosstalk level between a first line pair and a second line pair of a multi-line phone caused by the multi-line phone, and determining a second crosstalk level between each of the first line pair and the second line pair of the multi-line phone. The second crosstalk level is determined when the first line pair and the second line pair are coupled to a first predetermined length of network line pair cable. The method further includes determining a change of network generated crosstalk levels caused by the multi-line phone by subtracting the first crosstalk level from the second crosstalk level.

21 Claims, 7 Drawing Sheets

U.S. PATENT DOCUMENTS

2010/0067665 A1* 3/2010 Ray .................................. 379/3
2011/0031418 A1* 2/2011 Shcherback et al. ..... 250/559.29
2011/0069782 A1* 3/2011 Wilson et al. ................. 375/295

* cited by examiner

METHOD AND APPARATUS FOR DETERMINING A CHANGE IN NETWORK-GENERATED CROSSTALK LEVELS CAUSED BY A MULTI-LINE PHONE

BACKGROUND

Multi-line phones, such as two-line phones, are popular for use in both consumer and in business markets. Typically, these phones are either connected with either a broadband network or with a traditional PSTN network through twisted pairs of copper lines. One advantage of a two-line phone is that a user has the option of conducting, for example, a conference call, using two different lines simultaneously. However, in some cases, crosstalk may occur between the two different lines which can cause interference problems and degrade the overall voice quality of the conference call. Crosstalk is typically caused by an undesired capacitive, inductive, or conductive coupling from one circuit, part of a circuit, channel, or transmission line to another. Inductive coupling typically refers to the transfer of energy from one circuit component, such as a transmission line, to another through a shared magnetic field. For example, a change in current flow through one transmission line may induce current flow in the other transmission line through inductive coupling. Capacitive coupling is typically described as the transfer of energy by means of the capacitance created between two circuit components, such as two transmission lines. In telecommunications or telephony, crosstalk is sometimes distinguishable as speech or signaling tones that leak from one communication line to another. In other situations, crosstalk between communication lines may manifest itself as noise or interference on the transmission line. Crosstalk may also be generated in network loops through inductive couplings and then propagate to the two-line phone via a twisted pair connection. In addition, the two-line phone may include circuitry itself which may cause crosstalk between lines of the multi-line phone. In addition, the circuitry inside the multi-line phone may amplify, or otherwise change or modify, the crosstalk signal levels that are generated in the network loops.

SUMMARY

An embodiment of a method for determining a change in network-generated crosstalk levels caused by a multi-line phone includes determining a first crosstalk level between a first line pair and a second line pair of a multi-line phone caused by the multi-line phone, and determining a second crosstalk level between each of the first line pair and the second line pair of the multi-line phone. The second crosstalk level is determined when the first line pair and the second line pair are coupled to a first predetermined length of network line pair cable. The method further includes determining a change of network generated crosstalk levels caused by the multi-line phone by subtracting the first crosstalk level from the second crosstalk level.

An embodiment of an apparatus for determining a change in network-generated crosstalk levels caused by a multi-line phone includes a signal generator for generating a test signal, and a first feeding bridge coupled to the signal generator. The first feeding bridge includes a first terminal and a second terminal. The apparatus further includes a signal analyzer and a second feeding bridge coupled to the signal analyzer. The second feeding bridge includes a third terminal and a fourth terminal. The first terminal and second terminal are configured to be coupled to a first line pair of a multi-line phone, and the third terminal and fourth terminal are configured to be coupled to a second line pair of the multi-line phone. The signal analyzer is configured to determine a first crosstalk level between the first line pair and the second line pair of the multi-line phone when the multi-line phone is coupled to the first terminal and the second terminal.

A method for determining a crosstalk level between line pairs of a multi-line phone includes measuring a first crosstalk level between a first line pair and a second line pair of a multi-line phone. The first crosstalk level is determined when the first line pair and the second line pair are coupled to a measurement circuit. The method further includes measuring a second crosstalk level between a first resistance device and a second resistance device. The second crosstalk level is determined when the first resistance device and the second resistance device are coupled to the measurement circuit. The method further includes subtracting the first crosstalk level from the second crosstalk level to determine a crosstalk level between the first line pair and the second line pair of the multi-line phone.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Certain embodiments of the invention provide for a procedure to measure the effect of a multi-line phone on crosstalk that is generated in network loops through which the multi-line phone is connected. Various embodiments provide for the measuring and identifying of any amplification or other changes in network generated crosstalk levels that are caused by the use of a multi-line phone. For multi-line phones that include technologies that control crosstalk generated by a network, some embodiments provide for a procedure of measuring the capability of a two-line phone to suppress the crosstalk generated by the network. Various embodiments provide for measuring the effects of crosstalk generated by a variety of networks including wire-line, broadband, and wireless local loop networks. Although particular embodiments are described with respect to a two-line phone, it should be understood that in other embodiments any multi-line phone may be used.

Figure 1:
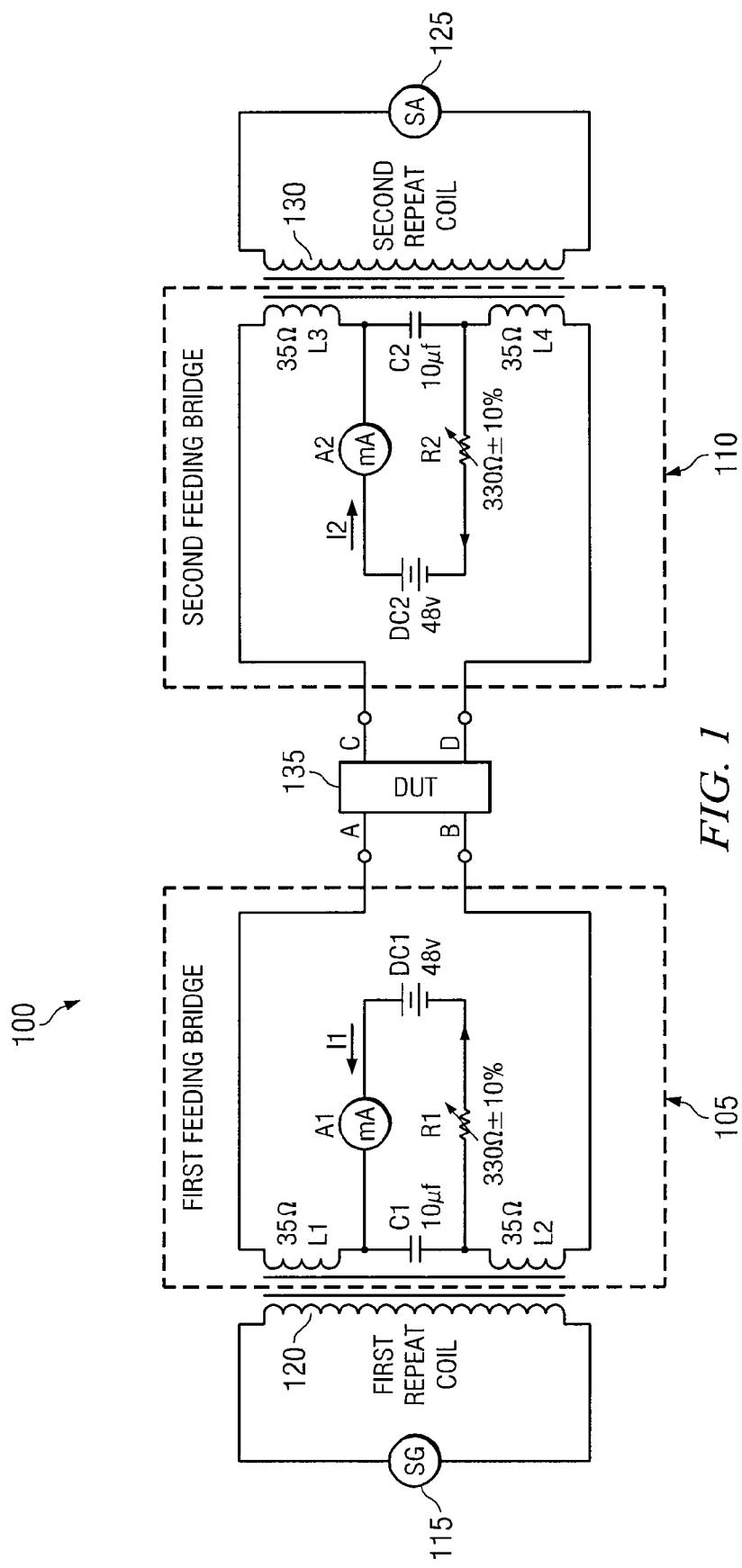
FIG. 1 is an embodiment of a crosstalk signal strength measurement circuit.

FIG. 1 is an embodiment of a crosstalk signal strength measurement circuit 100. The circuit 100 includes a first feeding bridge 105 and a second feeding bridge 110. The first feeding bridge 105 is inductively coupled to a signal generator (SG) 115 via a first repeat coil 120. The second feeding bridge 110 is inductively coupled to a signal analyzer 125 via a second repeat coil 130. In at least one embodiment, the first feeding bridge 105 and the second feeding bridge 110 are substantially identical in construction. The first feeding bridge 105 includes a terminal A and a terminal B, and the second feeding bridge 110 includes a terminal C and a terminal D. In various embodiments, a device under test (DUT) 135 is coupled to terminals A and B to the first feeding bridge 105 and terminals C and D of the second feeding bridge 110 in order to measure crosstalk associated with the DUT 135. In at least one embodiment, the DUT 135 is a multi-line phone, such as a two-line phone. In one embodiment, a line pair associated with a first line of the multi-line phone is coupled to terminals A and B, and a line pair associated with a second line of the multi-line is coupled to terminals C and D. The circuit 100 may then be used to measure crosstalk levels between the two-line pairs.

The first feeding bridge 105 includes a first inductance device L1 and a second inductance device L2 which are configured to inductively couple with the first repeat coil 120. In at least one embodiment, the first inductance device L1 and the second inductance device L2 have an impedance of 35 ohms. In still other embodiments, the first inductance device L1 and the second inductance device L2 may be chosen such that the total impedance of the first feeding ridge 105 is equal to any desired value. For example, the first inductance device L1 and the second inductance device L2 may be chosen such that the total impedance of the first feeding bridge 105 is substantially equal to 600 ohms or 900 ohms. In at least one embodiment, the first repeat coil 120 comprises a primary side of a transformer, and the first inductance device L1 and the second inductance device L2 comprise a secondary side of the transformer. The first feeding bridge 105 further includes a first capacitance device C1 coupled between the first inductance device L1 and the second inductance device L2. In at least one embodiment, the first capacitance device C1 is a 10 microfarad capacitor. The first capacitance device C1 is configured to pass alternating current (AC) signals generated by the signal generator 115 to terminals A and B. The first feeding bridge 105 further includes a first variable resistance device R1, a first direct current (DC) source DC1, and a first current measuring device A1 connected to one another in series and to the first capacitance device C1 in parallel. In at least one embodiment, the first variable resistance device R1 is a variable resistor having an adjustable resistance value. In a particular embodiment, the first variable resistance device R1 has a resistance of 330 ohms adjustable ±10%. In at least one embodiment, the first DC source DC1 is a DC current source. In a particular embodiment, the first DC source DC1 has a voltage of 48 volts, representative of an off-hook voltage of a telephone line. In still other embodiments, other voltages may be used. In at least one embodiment, the first current measuring device A1 is configured to measure a current I1 supplied by the first DC source DC1. In a particular embodiment, the first current measuring device A1 is an ammeter. In various embodiments, the resistance of the first variable resistance device R1 may be adjusted in order to adjust the level of the current I1. In a particular embodiment, the level of current I1 is adjusted to be substantially equal to a typical off-hook current of a telephone line.

The second feeding bridge 110 includes a third inductance device L3, a fourth inductance device L4, a second capacitance device C2, a second variable resistance device R2, a second DC source DC2, and a second current measuring device A2. In various embodiments, these components of the second feeding bridge 110 are configured in substantially the same manner as those of the first feeding bridge 105. The third inductance device L3 and the fourth inductance device L4 are inductively coupled to the second repeat coil 130. In at least one embodiment, the second repeat coil 130 comprises a primary side of a transformer, and the third inductance device L3 and the fourth inductance device L4 comprise a secondary side of the transformer. The third inductance device L3 is further coupled to terminal C, and the fourth inductance device L4 is further coupled to terminal D. The second current measuring device A2 is configured to measure a current I2 provided by the second DC source DC2. The resistance of the second variable resistance device R2 may be adjusted to adjust the value of the current I2. In some embodiments, the values of the components of the second feeding bridge 110 are substantially equal to the values of the corresponding components of the first feeding bridge 105. In a particular embodiment, the currents I1 and I2 are adjusted to be substantially equal when a particular DUT 135 is coupled to terminals A-D. Embodiments of procedures for using the circuit 100 to measure crosstalk associated with various devices are further discussed with respect to FIGS. 2-5.

Figure 2:
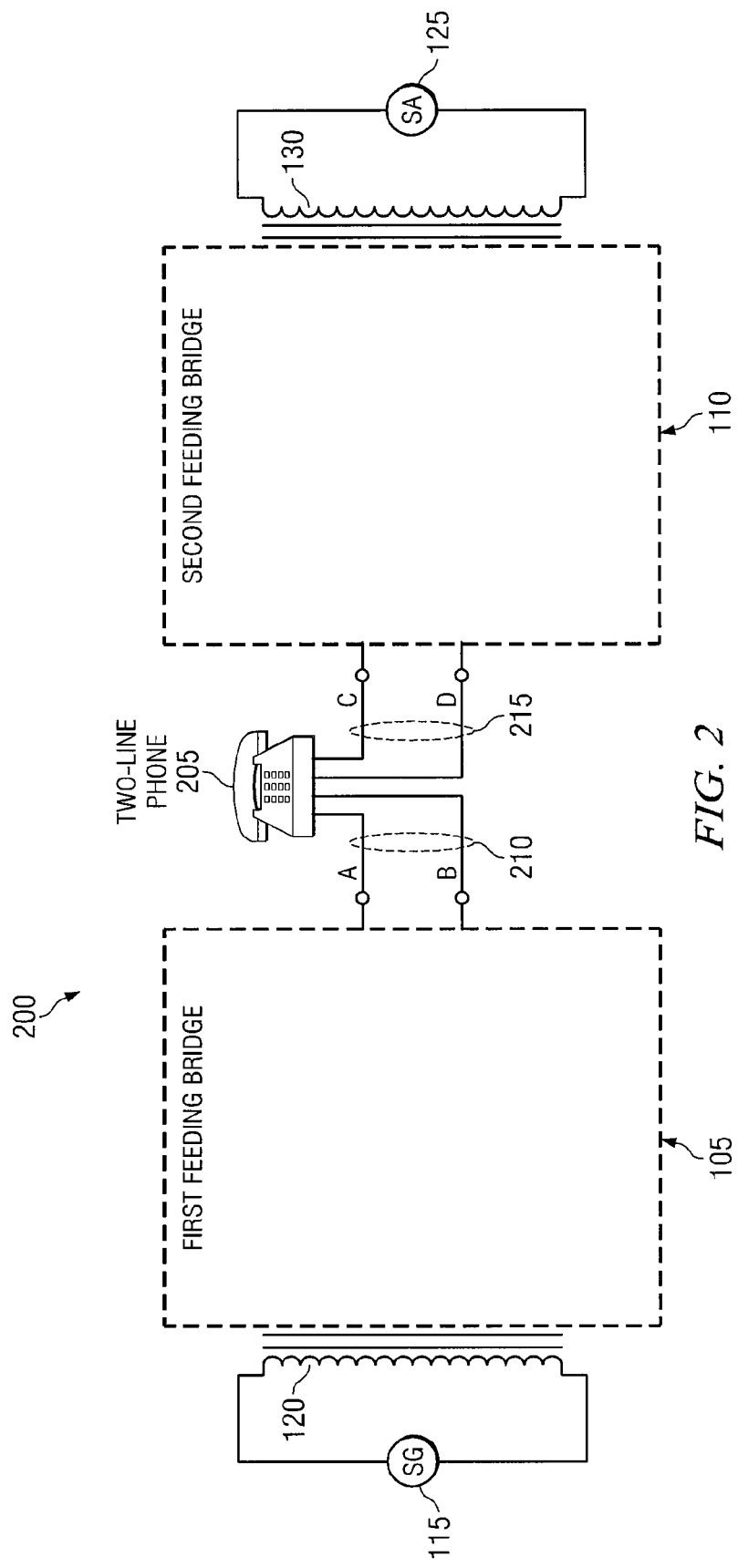
FIG. 2 is an embodiment of a configuration for measuring crosstalk between line pairs of a two-line phone using the circuit of FIG. 1.

FIG. 2 is an embodiment of a configuration 200 for measuring crosstalk between line pairs of a two-line phone 205 using the circuit 100 of FIG. 1. In the embodiment of FIG. 2, the two wires of a first line pair 210 of the two-line phone 205 are connected to terminal A and terminal B, respectively, of the first feeding bridge 105. The two wires of a second line pair 215 of the two-line phone 205 are connected to terminal C and terminal D, respectively, of the second feeding bridge 110. The first line pair 210 supports communication over a first line of the two-line phone 205 and the second line pair 215 supports communication over a second line of the two-line phone 205. In the embodiment illustrated in FIG. 2, each of the lines of the two-line phone 205 are in an off-hook state during the measurement process. In the embodiment illustrated in FIG. 2, the first variable resistance device R1 of the first feeding bridge 105 and the second variable resistance device R2 of the second feeding bridge 110 are adjusted so as to obtain substantially identical current flow in each of the first feeding bridge 105 and second feeding bridge 110. In a particular embodiment, the current in the first feeding bridge 105 and the second feeding bridge 110 are set at a current level to simulate off-hook current of a telephone line as specified by one or more industry standards.

The signal generator 115 is then used to generate sinusoidal test signals that are transferred by inductance to the first feeding bridge 105 by the first repeat coil 120. In a particular embodiment, the sinusoidal test signals generated by the signal generator 115 are swept in a frequency range from 200 Hz to 3.5 KHz to represent a narrow band of speech signals. In a particular embodiment, the signal strength of the sinusoidal test signals generated by the signal generator 115 are set at a signal strength of −10 dBm to simulate a typical real-world scenario of voice communication over a phone line. The sinusoidal test signals received by the first feeding bridge 105 from the signal generator are 115 are then communicated to the first line pair 210 by the first feeding bridge. Any crosstalk that may occur between the first line pair 210 and second line pair 215 is then transferred to the second line pair 215, for example, by one or more of inductive coupling or capacitive coupling. The crosstalk is then received by the second feeding bridge 110 and transferred by inductive coupling to the second repeat coil 130 by the second feeding bridge 110.

The signal strength of the crosstalk may then be measured by the signal analyzer 125. In a particular embodiment, the crosstalk is the voltage level measured by the signal analyzer 125. In the embodiment of FIG. 2, the crosstalk level measured by the signal analyzer 125 is representative of any crosstalk produced by the two-line phone 205, as well as any crosstalk that may be introduced by the circuit 100. The value of the level of crosstalk measured in the configuration 200 of FIG. 2 is set to the variable X.

Figure 3:
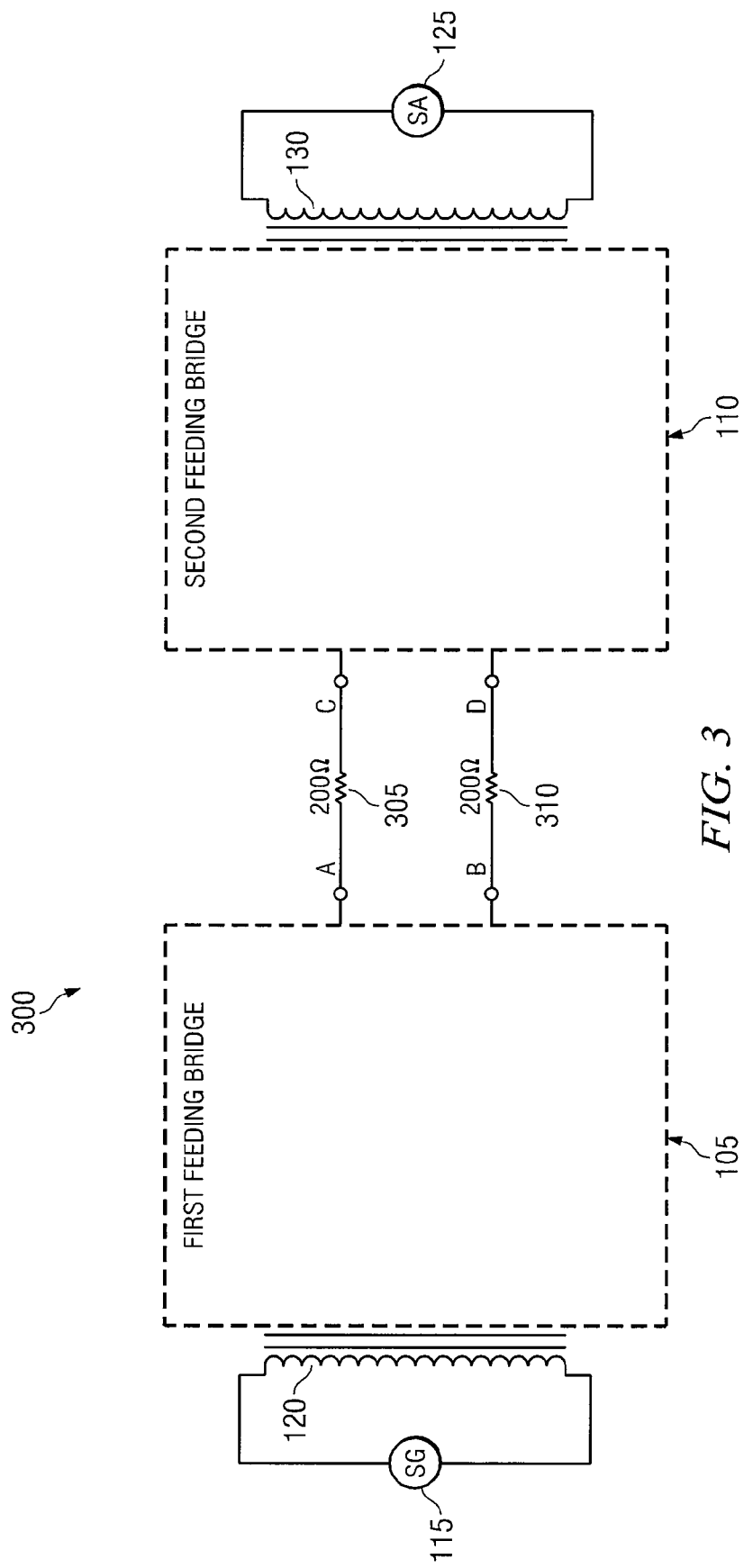
FIG. 3 is an embodiment of a configuration for measuring crosstalk introduced by the circuit of FIG. 1 coupled to resistance devices representative of an off-hook resistance of each line of the two-line phone.

FIG. 3 is an embodiment of a configuration 300 for measuring crosstalk introduced by the circuit 100 coupled to resistance devices representative of an off-hook resistance of each line of the two-line phone 205. In the embodiment illustrated in FIG. 3, a first off-hook resistance device 305 is coupled between terminal A of the first feeding bridge 105 and terminal C of the second feeding bridge 110. A second off-hook resistance device 310 is coupled between terminal B of the first feeding bridge 105 and terminal D of second feeding bridge 110. The first off-hook resistance device 305 and a second off-hook resistance device 310 are used to simulate the off-hook resistances for each of the first line pair 210 and the second line pair 215 of the two-line phone 205. The use of the first off-hook resistance device 305 and the second off-hook resistance device 310 in configuration 300 of FIG. 3 is intended to simulate a two-line phone 205 that does not produce any crosstalk between the first line pair 210 and the second line pair 215. Similarly as discussed in FIG. 2, the resistances of the first variable resistance device R1 and the second variable resistance device R2 are adjusted to set currents I1 and I2 in each of the first feeding bridge 105 and the second feeding bridge 110 to be substantially equal. In a particular embodiment, the currents are set to be substantially equal to an off-hook current of a telephone line. The signal generator 115 is then used to generate sinusoidal test signals in a similar manner as discussed with respect to FIG. 2. The level of crosstalk is then measured by the signal analyzer 125. The measured crosstalk is representative of crosstalk introduced by the circuit coupled to a two-line phone 205 having no crosstalk between the first line pair 210 and the second line pair 215. The value of the level of crosstalk measured in the configuration 300 of FIG. 3 is set to the variable Y. By taking a difference between the crosstalk level measured in configuration 300 in FIG. 3 (Y) and the crosstalk level measured in configuration 200 of FIG. 2 (X), a crosstalk level between the first line pair 210 and the second line pair 215 produced by the two-line phone 205 alone is determined with any crosstalk due to the circuit 100 being removed. Setting this crosstalk difference equal to the variable X, the amount of crosstalk ($\alpha$) caused by the two-line phone 205 may be determined using the following equation: $\alpha = Y - X$.

Figure 4:
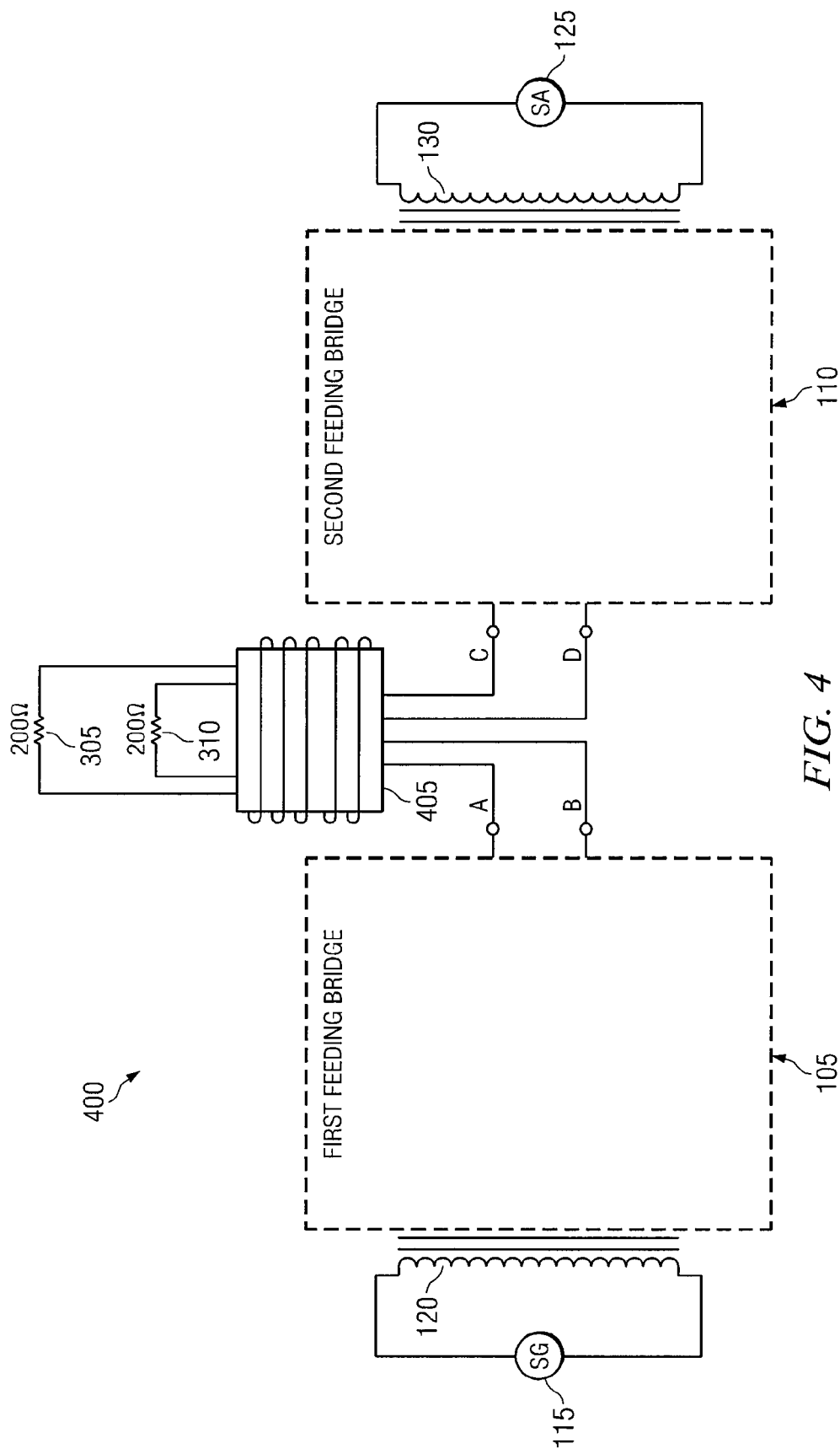
FIG. 4 is an embodiment of a configuration for measuring crosstalk of off-hook resistance devices coupled to a real cable spool using the circuit of FIG. 1.

FIG. 4 is an embodiment of a configuration 400 for measuring crosstalk of off-hook resistance devices coupled to a real cable spool 405 using circuit 100 of FIG. 1. In the embodiment illustrated in FIG. 4, a real cable spool 405 is coupled to terminals A and B of the first feeding bridge 105 and terminals C and D of the second feeding bridge 110. In various embodiments, the real cable spool 405 includes a spool of multi-conductor cable configured to be substantially equal to a predetermined length of network line pair cable, the network line pair cable including two line pairs, each line pair having two conductors. The real cable spool 405 is representative of telephone network cabling of the predetermined length to which each line pair of the two-line phone 205 is coupled. One embodiment of the real cable spool 405 that may be used in various embodiments is described in U.S. patent application Ser. No. 11/978,341, filed Oct. 29, 2007, incorporated herein by reference. Other embodiments of the real cable spool 405 are further described with respect to FIG. 7. In still other embodiments, the real cable spool 405 may be replaced by a one or more predetermined lengths of network line pair cable. In still other embodiments, two separate real cable spools 405 may be used to correspond to each line pair of the two-line phone 205. In the embodiment illustrated in FIG. 4, the first off-hook resistance device 305 and the second off-hook resistance device 310 are coupled to the real cable spool 405 in a configuration representing a two-line phone having no crosstalk coupled to a telecommunication network which may induce crosstalk between the line pair 210 and second line pair 215 of the two-line phone 205. As similarly described with respect to FIGS. 2 and 3, the resistances of the first variable resistance device R1 and the second variable resistance device R2 are adjusted so as to adjust the current flow through each of the first feeding bridge 105 and the second feeding bridge 110 to be substantially equal. Also as similarly described with respect to FIGS. 2 and 3, the signal generator 115 produces a sinusoidal test signal that is transferred to the first feeding bridge 105 by the first repeat coil 120 via inductive coupling, and crosstalk generated in the real cable spool is transferred from the second feeding bridge 110 to the second repeat coil 130 by induction. The signal strength of the crosstalk is then measured by the signal analyzer 125. The procedure may be repeated for each desired loop length of the real cable spool 405 by reconfiguring the real cable spool to the desired loop length. For example, the procedure may be repeated for predetermined loop lengths of 4 Kft, 9 Kft, 15 Kft, and 16 Kft. The measured crosstalk values are representative of the effects of crosstalk between line pairs produced by the real cable spool 405 coupled to a two-line phone 205 that does not produce its own crosstalk between line pairs. The value of the crosstalk level measured in the configuration 400 of FIG. 4 is set to the variable $Z_1$.

Figure 5:
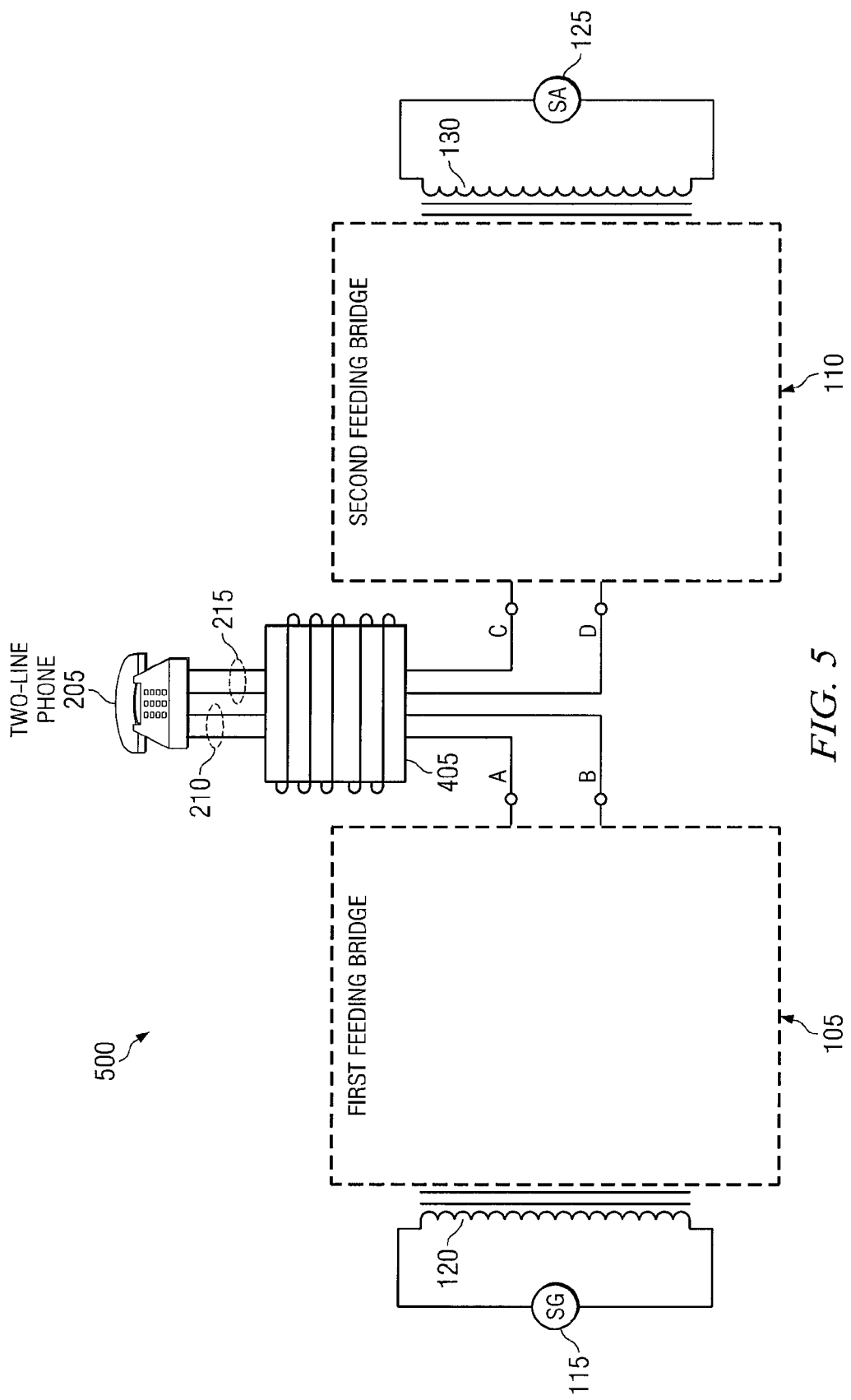
FIG. 5 is an embodiment of a configuration for measuring crosstalk between line pairs of the two-line phone coupled to the real coupled spool using the circuit of FIG. 1.

FIG. 5 is an embodiment of a configuration 500 for measuring crosstalk between line pairs of the two-line phone 205 coupled to the real coupled spool 405 using the circuit 100 of FIG. 1. In the embodiment of FIG. 5, the first line pair 210 of the two-line phone 205 is coupled to terminal A of the first feeding bridge 105 and terminal B of the first feeding bridge 105 via the real cable spool 405 configured to a predetermined loop length. The second line pair 215 of the two-line phone 205 is coupled to terminal C and terminal D of the second feeding bridge 110 via the real cable spool 405. In the particular embodiment illustrated in FIG. 5, the real cable spool 405 includes separate twisted pair conduction lines for each of the first line pair 210 and the second line pair 215 such that the first line pair 210 and the second line pair 215 are not electrically connected to one another. The configuration 500 of FIG. 5 represents the first line pair 210 and second line pair 215 of the two-line phone 205 being coupled to a telecommunication network. In still other embodiments, the real cable spool 405 may be replaced by coupling a network line pair cable of the predetermined length to each of the first line pair 210 and the second line pair 215. In still other embodiments, two separate real cable spools 405 may be used to correspond to each line pair of the two-line phone 205. In the embodiment illustrated in FIG. 5, each of the lines of the two-line phone 205 are in a off-hook state during the measurement process. Similarly as discussed with respect to FIGS. 2-4, the first variable resistance device R1 and second variable resistance device R2 of the first feeding bridge 105 and the second feeding bridge 110 are adjusted to obtain substantially equal current flow in each of the first feeding bridge 105 and the second feeding bridge 110. Also as similarly discussed with respect to FIGS. 2-4, the signal generator 115 generates a sinusoidal test signal that is transferred to the first feeding bridge 105 via inductive coupling by the first repeat coil 120. The sinusoidal text signal is communicated to terminals A and B of the first feeding bridge 105 and subsequently, to the real cable spool 405 and the first line pair 210 of the two-line phone 205. Any crosstalk induced between the first line pair 210 and the second line pair 215 by one or more of the two-line phone 205 and the real cable spool 405 is communicated to terminals C and D of the second feeding bridge 110. The crosstalk is then transferred from the second feeding bridge 110 to the second repeat coil 130 via inductive coupling. The signal strength of the crosstalk is then measured by the signal analyzer 125. In various embodiments, the procedure of FIG. 5 is repeated for each of the one or more desired loop lengths of the real cable spool 405 as discussed with respect to FIG. 4. The value of the crosstalk level measured in configuration 500 of FIG. 5 is set to variable $Z_2$. A difference between the crosstalk levels measured in FIG. 5 ($Z_2$) and the crosstalk levels measured in FIG. 4 ($Z_1$) is used to determine the amount of crosstalk caused by the two-line phone 205 when connected to the real cable spool 405. By the amount of crosstalk caused by the two-line phone 205 when connected to the real cable spool 405 is set to the variable β, and may be determined from the following equation: $β=Z_2-Z_1$.

By performing the procedures described with respect to FIGS. 2-5, the amount of amplification or change in network generated crosstalk levels if caused by the two-line phone 205 can be determined. For example, by setting the change in network generated crosstalk levels caused by the two-line phone 205 equal to μ, this value can be determined according to the following equation: $μ=β-α$. In various embodiments μ may be calculated at different loop lengths of interest by reconfiguring the loop length of the real cable spool 405. The value of μ provides a measure of the change in crosstalk signal levels caused by the two-line phone 205 that are originally generated in the real cable spool 405 through which the two-line phone 205 is connected. Accordingly, the ability of the two-line phone 205 to handle network generated crosstalk may be determined.

Figure 6:
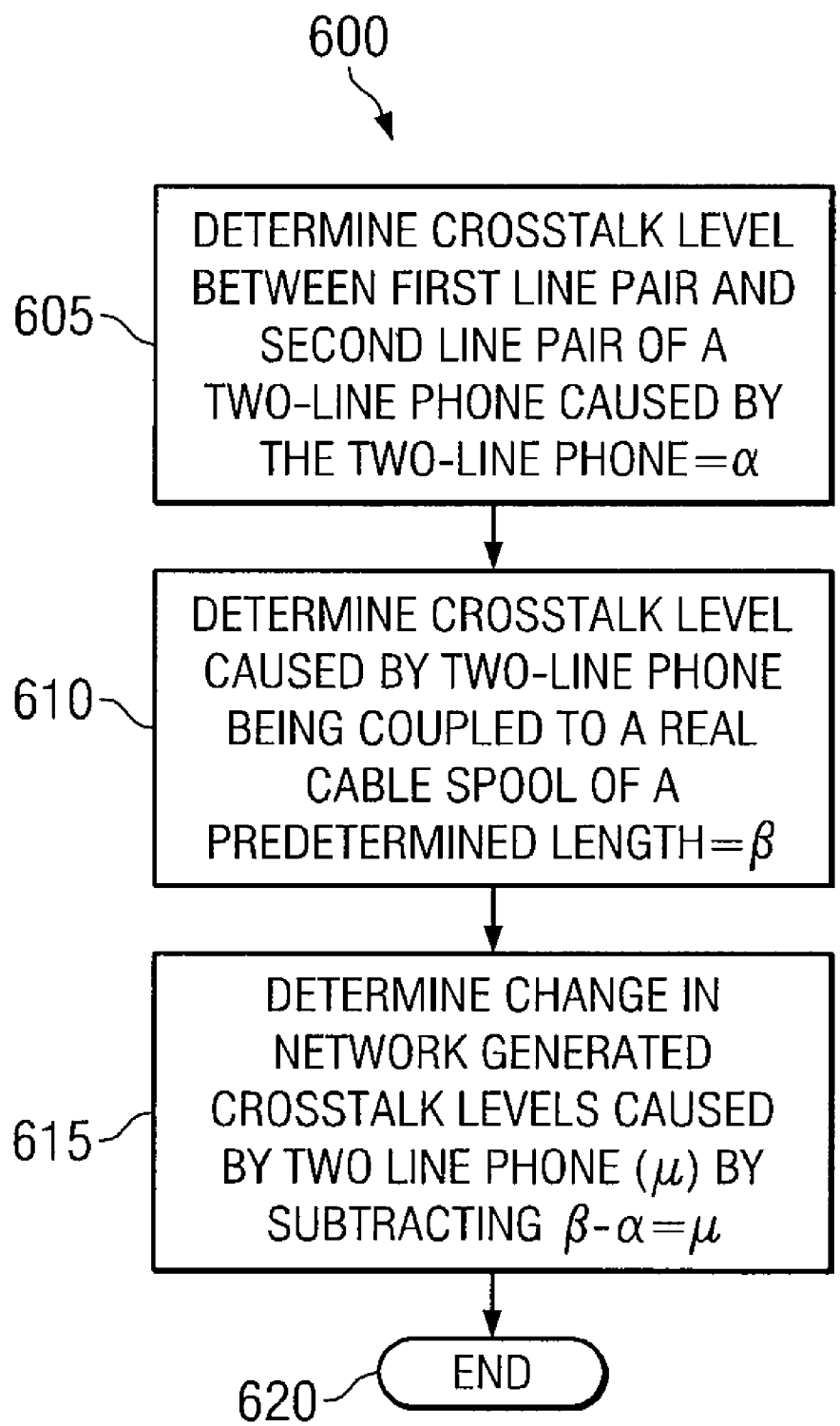
FIG. 6 is an embodiment of a procedure for determining a change in network generated crosstalk levels caused by a multi-line phone.

FIG. 6 is an embodiment of a procedure 600 for determining a change in network generated crosstalk levels caused by a multi-line phone. In a particular embodiment, the multi-line phone is a two-line phone 205. The procedure 600 may be used to determine the effect, such as amplification, on network generated crosstalk between line pairs caused by the multi-line phone. For example, circuitry within a particular two-line phone 205 may amplify crosstalk levels generated in the network. In step 605, a crosstalk level between the first line pair 210 and the second line pair 215 of the two-line phone 205 caused by the two-line phone 205 is determined and given the variable α. In a particular embodiment, this crosstalk level is determined by measuring a crosstalk level associated with the circuit 100 being coupled to the first off-hook resistance device 305 and the second off-hook resistance device 310 as described with respect in FIG. 3, and subtracting a crosstalk level measured using the circuit 100 coupled to the first line pair 210 and second line pair 215 of the two-line phone 205 as described with respect to FIG. 2. In step 610, a crosstalk level caused by the two-line phone 205 when coupled to a real cable spool 405 of a predetermined length is determined and is set equal to the variable β. In a particular embodiment, this crosstalk level is determined by measuring a crosstalk level of the two-line phone 205 coupled to the real cable spool 405 configured to a predetermined loop length using the circuit 100 as described with respect to FIG. 5, and subtracting a measured crosstalk of the first off-hook resistance device 305 and the second off-hook resistance device 310 being coupled to the real cable spool 405 using circuit 100 as described with respect to FIG. 4. In step 615, the change in network generated crosstalk levels caused by or due to, the two-line phone 205 is determined by subtracting the crosstalk level α determined in step 605 from the crosstalk level β determined in step 610 according to the following equation: $μ=β-α$. In various embodiments, step 610 may be repeated for one or more desired predetermined loop lengths of real cable spool 405 to determine the effects on network generated crosstalk caused by the two-line phone 205 when coupled to various network loop lengths of interest. In step 620, the procedure 600 ends.

Figure 7:
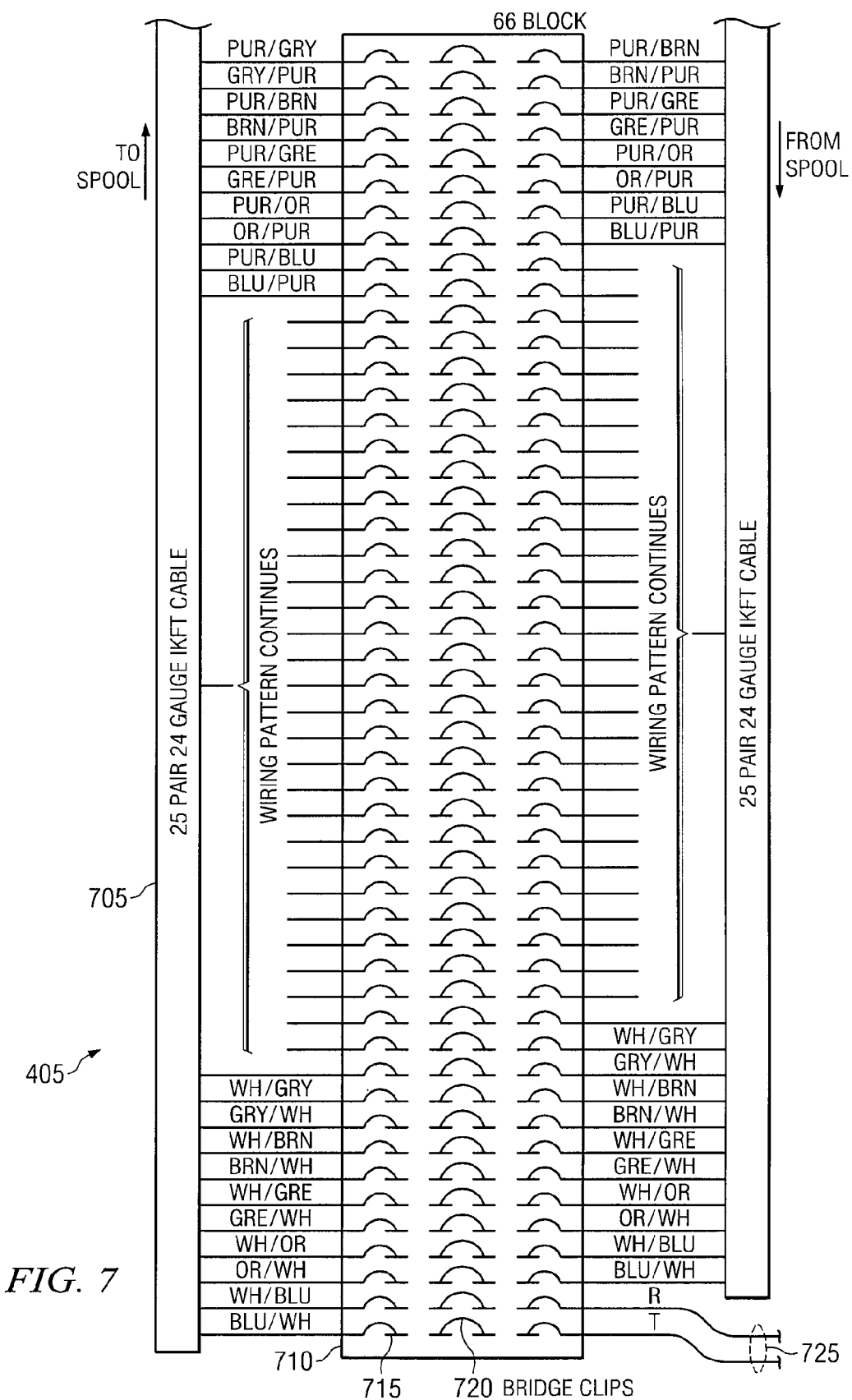
FIG. 7 is an embodiment of the real cable spool of FIGS. 4 and 5.

FIG. 7 is an embodiment of the real cable spool 405 of FIGS. 4 and 5. The real cable spool 405 includes a spool of multi-pair cable 705 of a predetermined length. In the particular embodiment illustrated in FIG. 7, the spool of multi-pair cable 705 comprises 1,000 feet of 25-pair 24 AWG cable. The real cable spool 405 further includes a telecommunication punch-down block 710. A punch-down block 710 is used to connect sets of wires in a telecommunication system. For example, punch-down block 710 may be used to couple one line pair to another line pair. In the particular embodiment illustrated in FIG. 7, the punch-down block 710 is a 66 block. The 66 block has 50 rows, and each row has four columns of electrical slots 715. A punch-down bridge clip 720 may be inserted in the two middle slots of a particular row, and functions to electrically connect the left-most slot 715 to the right-most slot 715 of a particular row. In the particular embodiment illustrated in FIG. 7, 50 punch-down bridge clips 720 are used to complete each left-most slot to each right-most slot of a particular row. The construction of the real cable spool 405 according to the illustrated embodiment includes punching-down or terminating the ends of the spool of multi-pair cable 705 so that they connect to the punch-down block 710 in a manner as illustrated in FIG. 7. The left-most side of the punch-down block 710 will be punched-down (or terminated) by having each line pair of the multi-pair cable 705 coupled to slots, while the right-most side of the punch-down block 710 will have the line pairs of the multi-pair cable shifted upward by one line pair. This shift will move all connections on the right-most side of the punch-down block 710 upward by two wires (one pair). For example, the first pair of wires (blue/white and white/blue) will be connected to the second pair of terminals on the punch-down block. This pattern will continue up the entire length of the punch-down block 710. After all the remaining pairs are filled on the right-most side of the punch-down block 710 except for the first pair, the end of the multi-pair cable will have one pair (gray/purple and purple/gray) not connected. After the multi-pair cable 705 is connected to the punch-down block 710 in the described manner, the punch-down bridge clips 720 are attached, thereby electrically connecting both halves of telecommunication punch-down block 710 together. A single pair wire 725 of a second predetermined length is connected to the pair of connectors on the right-most hand side of the punch-down block 710 that were not connected to the punch-down block 710. In a particular embodiment, the single pair wire 725 is a one foot length of 26 AWG single pair (two conductor) wire. The other end of the single pair wire 725 may be coupled to a junction box (not illustrated), such as an RJ11 junction box.

In configuring the teal cable spool 405 for operation, the end of the single pair wire 725 that is not coupled to the punch-down block 710 may be coupled to terminals A and B of the first feeding bridge 105. After determining how many Kft of cable are desired for the real cable spool 405, the number of pairs of connectors on the punch-down block 710 ate counted corresponding to the number of Kft needed, starting at 0 Kft on the first pair. For example, 9 Kft would be the tenth pair of connections on the punch-down block 710, and 15 Kft would be on the 16th pair, and so on. The punch-down bridge clips 720 corresponding to that pair are removed, and a pig-tail (not illustrated) is pushed into the pair of slots on the same side (right-most side) of the punch-down block 710 as the single pair wire 725. As a result, the single pairs comprising the multi-pair cable 705 are interconnected in such a way so as to form a spool of one or more single pair conducting lines equal to the desired length. The other end of the pig-tail is then connected to the desired device under test, such as the first line pair 210 of the two-line phone 205, as illustrated in FIG. 5. In various embodiments, to facilitate connection of the device under test to the pig-tail, the pig-tail may be connected to an RJ11 junction box using another single pair wire (not illustrated). After the initial hook-up, all that is required to set the real cable spool 405 to a different loop length is replacement of the punch-down bridge clips 720, removal of punch-down bridge clips on a new location on the punch-down block 710, and movement of the pig-tail to the new location.

Although the line pairs of the real cable spool 405 are substantially wrapped around a spool (not illustrated), the real cable spool 405 still forms a good representation of a straight cable of the same desired length. Although the real cable spool 405 is substantially a solenoid and magnetic fields may be produced in the circular coils, for even numbers of Kft (for example, 8 Kft and 16 Kft) loop lengths, the magnitude and direction of the magnetic field produced by a first loop carrying current in one direction is completely cancelled out by the magnetic field produced by a second loop carrying current in the opposite direction. This cancellation effect remains the same for other solenoid effects. If odd Kft lengths of the real cable spool 405 are desired, for example, 7 Kft and 15 Kft cable lengths, an extra 500 ft. two-pair spool may be coupled to the real cable spool 405 for measuring the network crosstalk of such lengths in some embodiments. Although, the particular embodiment of FIG. 7 is illustrated so as to be configured to form a single line pair of cable having two conductors of a predetermined length, it should be understood that the real cable spool 405 may be constructed in various embodiments to have two or more line pairs of cable of the predetermined length in order to correspond to each line pair of a multi-line phone. For example in a particular embodiment, the real cable spool 405 may be configured to have two line pairs of the predetermined length to correspond to the first line pair 210 and the second line pair 215 of two-line phone 205. In a particular embodiment, the spool of multi-pair cable 705 of the real cable spool comprises 1,000 feet of cable having 40 or more pairs such that two line pairs of the predetermined length may be configured on the real cable spool 405. In still other embodiments, a separate real cable spool 405 having a single line pair of the predetermined length may be used for each of the first line pair 210 and the second line pair 215 of the two-line phone 205.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for determining a change in network-generated crosstalk levels caused by a multi-line phone comprising:
    determining, using a signal analyzer, a first crosstalk level between a first line pair and a second line pair of a multi-line phone caused by the multi-line phone, wherein determining the first crosstalk level further comprises:
        measuring a third crosstalk level between the first line pair and the second line pair using a measurement circuit coupled to the first line pair and the second line pair;
        measuring a fourth crosstalk level between a first resistance device and a second resistance device using the measurement circuit, the measurement circuit being coupled to the first resistance device and the second resistance device; and
        subtracting, using the signal analyzer, the third crosstalk level from the fourth crosstalk level to determine the first crosstalk level;
    determining, using the signal analyzer, a second crosstalk level between each of the first line pair and the second line pair of the multi-line phone, the second crosstalk level being determined when the first line pair and the second line pair are coupled to a first predetermined length of network line pair cable; and
    determining, using the signal analyzer, a change of network generated crosstalk levels caused by the multi-line phone by comparing the first crosstalk level to the second crosstalk level.

2. The method of claim 1, wherein each of the first resistance device and the second resistance device have a resistance value representative of an off-hook resistance of the first line pair and the second line pair, respectively, of the multi-line phone.

3. The method of claim 1, wherein determining the second crosstalk level further comprises:
    measuring a fifth crosstalk level between a first resistance device and a second resistance device coupled to the first predetermined length of network line pair cable using the measurement circuit;
    measuring a sixth crosstalk level between the first line pair and the second line pair of the multi-line phone using the measurement circuit, each of the first line pair and the second line pair being coupled to the first predetermined length of network line pair cable using the measurement circuit; and
    subtracting the fifth crosstalk level from the sixth crosstalk level to determine the second crosstalk level.

4. The method of claim 3, wherein each of the first resistance device and the second resistance device have a resistance value representative of an off-hook resistance of the first line pair and the second line pair, respectively, of the multi-line phone.

5. The method of claim 1, further comprising:
    wherein the change of network generated crosstalk levels caused by the multi-line phone includes amplification of the network generated crosstalk levels by the multi-line phone.

6. The method of claim 1, wherein the first predetermined length of network line pair cable comprises a real cable spool configured to the first predetermined length, the real cable spool including a spool of multi-conductor network cable.

7. The method of claim 1 further comprising:
repeating the steps of determining the second crosstalk level and determining the change of network generated crosstalk levels using a second predetermined length of network line pair cable.

8. An apparatus for determining a change in network-generated crosstalk levels caused by a multi-line phone comprising:
a signal generator for generating a test signal;
a first feeding bridge coupled to the signal generator, the first feeding bridge including a first terminal and a second terminal;
a signal analyzer; and
a second feeding bridge coupled to the signal analyzer, the second feeding bridge including a third terminal and a fourth terminal;
wherein the first terminal and second terminal are configured to be coupled to a first line pair of a multi-line phone, and the third terminal and fourth terminal are configured to be coupled to a second line pair of the multi-line phone; and
wherein the signal analyzer is configured to determine a first crosstalk level between the first line pair and the second line pair of the multi-line phone when the multi-line phone is coupled to the first terminal and the second terminal.

9. The apparatus of claim 8, further comprising:
a first predetermined length of network line pair cable, wherein the first predetermined length of network line pair cable is configured to be coupled to the first line pair and the second line pair of the multi-line phone.

10. The apparatus of claim 9, wherein the first predetermined length of network line pair cable comprises a spool of multi-conductor network cable configured to the first predetermined length.

11. The apparatus of claim 9, wherein the signal analyzer is further configured to measure a second crosstalk level between each of the first line pair and the second line pair of the multi-line phone when the multi-line phone is coupled to the first terminal and the second terminal and the first predetermined length of network line pair cable is coupled to the multi-line phone.

12. The apparatus of claim 11, wherein a change of network generated crosstalk levels caused by the multi-line phone is determined by subtracting the first crosstalk level from the second crosstalk level.

13. The apparatus of claim 12, wherein the change of network generated crosstalk levels caused by the multi-line phone includes amplification of the network generated crosstalk levels by the multi-line phone.

14. The apparatus of claim 8, further comprising:
a first resistance device configured to be coupled between the first terminal of the first feeding bridge and the third terminal of the second feeding bridge; and
a second resistance device configured to be coupled between the second terminal of the first feeding bridge and the fourth terminal of the second feeding bridge.

15. The apparatus of claim 14, wherein each of the first resistance device and the second resistance device have a resistance value representative of an off-hook resistance of the first line pair and the second line pair, respectively, of the multi-line phone.

16. The apparatus of claim 14, wherein determining the first crosstalk level includes:
measuring a third crosstalk level between the first line pair and the second line pair when the first line pair is coupled to the first feeding bridge and the second line pair is coupled to the second feeding bridge;
measuring a fourth crosstalk level between the first resistance device and the second resistance device using the measurement circuit, when the first resistance device is coupled between the first terminal of the first feeding bridge and the third terminal of the second feeding bridge, and the second resistance device is coupled between the second terminal of the first feeding bridge and the fourth terminal of the second feeding bridge; and
subtracting the third crosstalk level from the fourth crosstalk level to determine the first crosstalk level.

17. The apparatus of claim 11, further comprising:
a first predetermined length of network line pair cable;
a first resistance device;
a second resistance device; and
wherein determining the second crosstalk level includes:
measuring a fifth crosstalk level between the first resistance device and the second resistance device when each of the first resistance device and the second resistance device are coupled between the first feeding bridge and the second feeding bridge, and each of the first resistance device and the second resistance device are further coupled to the first predetermined length of network line pair cable;
measuring a sixth crosstalk level between the first line pair and the second line pair of the multi-line phone when the first line pair is coupled to the first feeding bridge, the second line pair is coupled to the second feeding bridge, and each of the first line pair and the second line pair are further coupled to the first predetermined length of network line pair cable; and
subtracting the fifth crosstalk level from the sixth crosstalk level to determine the second crosstalk level.

18. The apparatus of claim 17, wherein each of the first resistance device and the second resistance device have a resistance value representative of an off-hook resistance of the first line pair and the second line pair, respectively, of the multi-line phone.

19. The apparatus of claim 17, wherein the first predetermined length of network line pair cable comprises a real cable spool configured to the first predetermined length, the real cable spool including a spool of multi-conductor network cable.

20. A method for determining a crosstalk level between line pairs of a multi-line phone comprising:
measuring, using the signal analyzer, a first crosstalk level between a first line pair and a second line pair of a multi-line phone, the first crosstalk level being determined when the first line pair and the second line pair are coupled to a measurement circuit;
measuring, using the signal analyzer, a second crosstalk level between a first resistance device and a second resistance device, the second crosstalk level being determined when the first resistance device and the second resistance device are coupled to the measurement circuit; and
subtracting, using the analyzer, the first crosstalk level from the second crosstalk level to determine a crosstalk level between the first line pair and the second line pair of the multi-line phone.

21. The method of claim 20, wherein each of the first resistance device and the second resistance device have a resistance value representative of an off-hook resistance of the first line pair and the second line pair, respectively, of the multi-line phone.

* * * * *